United States Patent [19]
Kume et al.

[11] 3,882,830
[45] May 13, 1975

[54] COMBUSTION CHAMBER DEVICE FOR INTERNAL COMBUSTION ENGINES

[75] Inventors: Tadashi Kume; Kimio Shinmura, both of Tokyo, Japan

[73] Assignee: Honda Giken Kogyo Kabushiki Kaisha, Tokyo, Japan

[22] Filed: June 29, 1973

[21] Appl. No.: 374,868

[52] U.S. Cl. ........... 123/75 B; 123/32 C; 123/32 K; 123/32 AA; 123/32 ST; 123/32 SP; 123/75 B; 123/191 S

[51] Int. Cl. ... F02b 19/00; F02b 19/10; F02b 19/18

[58] Field of Search .... 123/32 C, 32 D, 32 K, 32 L, 123/32 ST, 32 SP, 32 SA, 75 B, 191 S, 191 SP, 32 AA

[56] References Cited
UNITED STATES PATENTS

| | | | |
|---|---|---|---|
| 2,006,613 | 7/1935 | Wirrer | 123/32 R |
| 2,065,419 | 12/1936 | Bagnulo | 123/32 SP |
| 2,110,191 | 3/1938 | Bagnulo | 123/32 SP |
| 2,932,289 | 4/1960 | Witzky | 123/32 A |
| 3,443,553 | 5/1969 | Yamada et al. | 123/32 L |

FOREIGN PATENTS OR APPLICATIONS

| | | | |
|---|---|---|---|
| 1,035,600 | 8/1953 | France | 123/32 C |

Primary Examiner—Manuel A. Antonakas
Assistant Examiner—Tony Argenbright
Attorney, Agent, or Firm—Lyon & Lyon

[57] ABSTRACT

An internal combustion engine has a main combustion chamber supplied with a lean mixture and has an auxiliary combustion chamber supplied with a rich mixture. The chambers are connected by a restricted torch nozzle passage. A spark plug communicating with the auxiliary chamber ignites the rich mixture and causes a flame to project through the torch nozzle passage to burn the lean mixture in the main chamber. The auxiliary combustion chamber is defined within a replaceable flanged cup which has a first aperture communicating with a torch conducting opening both forming the restricted torch nozzle passage and a second aperture communicating with a spark plug. Proper positioning of the second aperture with respect to the spark plug recess automatically places the first aperture in proper alignment with the torch conducting opening.

5 Claims, 1 Drawing Figure

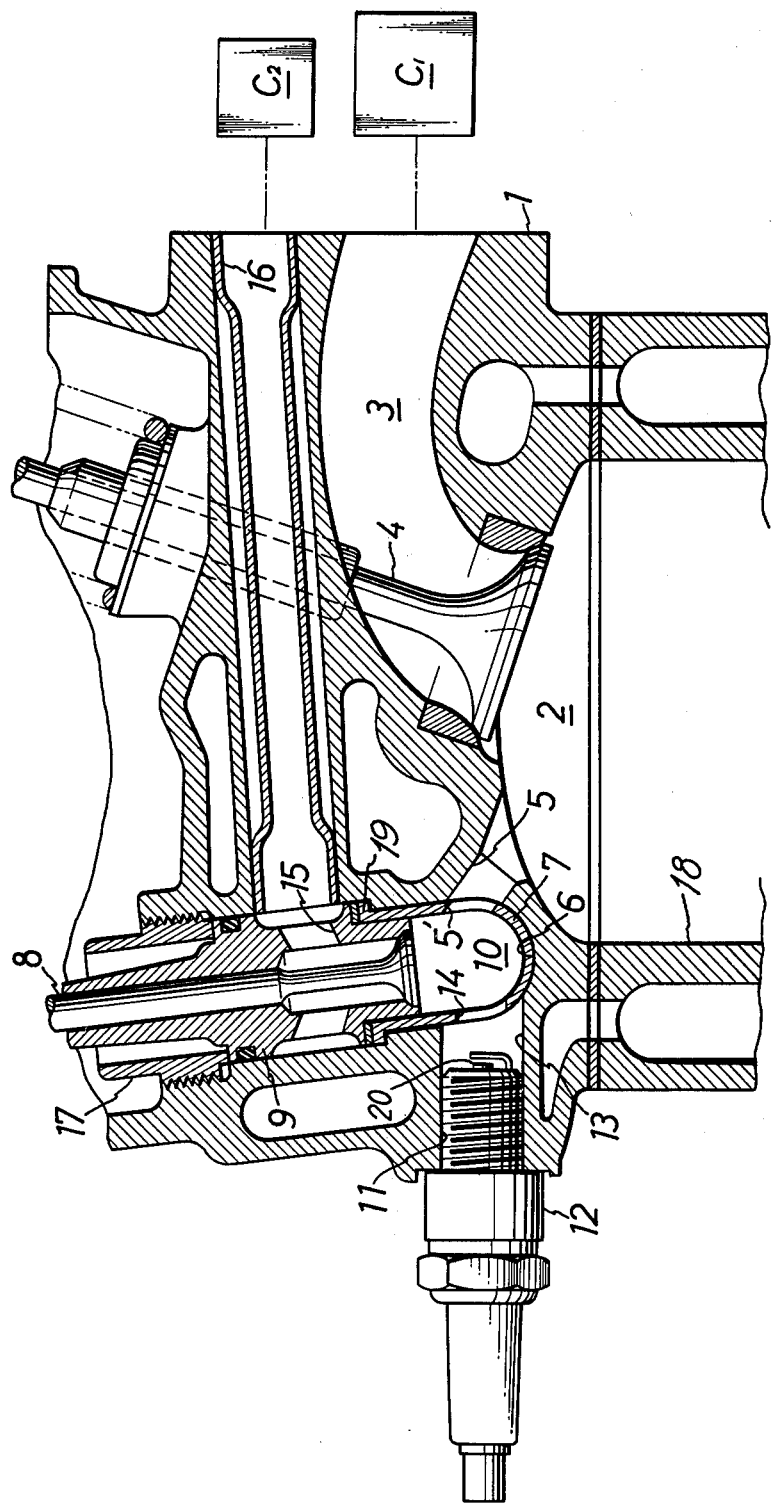

COMBUSTION CHAMBER DEVICE FOR INTERNAL COMBUSTION ENGINES

This invention relates to internal combustion engines and is particularly directed to reciprocating piston engines having a main combustion chamber supplied with a lean mixture, an auxiliary combustion chamber supplied with a rich mixture, and a torch nozzle passage connecting the two chambers. Spark ignition of the rich mixture in the auxiliary chamber causes a flame to project through the torch nozzle passage to burn the lean mixture in the main chamber.

The rich mixture supplied to the auxiliary chamber is readily ignitable by a spark plug but there is a tendency for unwanted solid products of combustion to adhere to the wall of the auxiliary chamber. It is then necessary to clean the interior of the auxiliary combustion chamber at intervals in order to obtain satisfactory combustion.

It is a feature of the present invention to provide a replaceable cup which forms the auxiliary combustion chamber. The replaceable cup is detachably mounted on the engine. A first aperture in the wall of the cup is aligned with the torch conducting opening, both forming a torch nozzle passage, and a second aperture in the wall of the cup is aligned with a recess which receives the spark plug electrodes. Proper positioning of the cup within the engine is achieved by aligning the second aperture with the spark plug recess, which recess is accessible from the exterior of the engine by simply unscrewing the spark plug.

Other and more detailed objects and advantages will appear hereinafter.

The drawing is a sectional side elevation showing a preferred embodiment of this invention.

Referring to the drawing, cylinder head 1 of the engine is provided with a main combustion chamber 2, one wall of which is formed by a piston, not shown, reciprocating within the cylinder 18. A carburetor $C_1$ supplies a lean mixture through an inlet passage 3 by way of main inlet valve 4 to the main combustion chamber 2. A similar valve and passage, not shown, control the exhaust from the main chamber 2. A cavity 6 formed within the engine head 1 receives a cup-shaped member 7 having a round bottom merging with a cylindrical portion and having a flanged open end 19 receiving the closure member 9. The cylindrical portion of the member 7 has a first aperture in its side wall comprising a torch nozzle 5' aligned with the torch conducting opening 5 in the cylinder head. The auxiliary combustion chamber 10 is formed within the cup 7 as its interior space.

The cylinder head 1 is provided with a threaded bore 11 which communicates with the recess 13 containing the electrodes 20 of the spark plug 12. A second aperture 14 is formed in the side wall of the cup 7 so that the auxiliary combustion chamber 10 and the recess 13 are placed in communication.

The closure member 9 is formed with an auxiliary inlet port 15 and the auxiliary inlet valve 8 is movably mounted on this closure member 9. The nut 17 fixes the closure member in place and clamps the cup flange 19 in position on the cylinder head 1. The valve 8 controls flow from the inlet port 15 into the auxiliary chamber 10. The passage 16 is supplied with a rich combustible mixture from the carburetor $C_2$.

In the suction stroke of the operation of the engine, the main chamber 2 is supplied with a lean mixture from the carburetor $C_1$, and the auxiliary chamber 10 is supplied with rich mixture from the carburetor $C_2$. The rich mixture contains unvaporized fuel particles and these tend to foul the spark plug electrodes 20. Such tendency is minimized by the present invention by positioning the spark plug electrodes 20 in the recess 13 adjoining the cup 7. This arrangement is effective to intercept most of the unvaporized fuel particles and thus to prevent them from adhering to the spark plug electrodes 20. Subsequently, when the spark plug is fired at the final stage of the compression stroke, the rich mixture present in the recess 13 can be ignited without fail, and acts as a source of flame immediately causing combustion of the rich mixture in the auxiliary chamber 10. The combustion flame thus formed is directed by the torch nozzle 5' and the torch conducting opening 5 to jet out into the main chamber 2 toward the center thereof. The lean mixture in the main chamber 2 is thus uniformly burned, starting from its central position to initiate the expansion stroke of the engine cycle. In this manner the engine can run efficiently with a leaner air-fuel ratio than the theoretical air-fuel ratio, realizing a substantial reduction in the amount of unburned constituents occurring in the engine exhaust.

In order to clean the auxiliary combustion chamber 10, the nut 17 is unscrewed and the closure member 9 is removed. Spark plug 12 is then unthreaded and removed. A screwdriver or other rod or tool is inserted into the threaded bore 11, now vacant, and further into the aperture 14 in the cup 7. The tool is then manipulated to pry the cup 7 loose out of the cavity 6. Cup 7 may then be readily withdrawn from the engine head for removal of accumulation of unwanted deposits within its interior.

Subsequently, when the cup 7 is replaced, a screwdriver or other tool is again inserted through the threaded bore into the small aperture 14 in the cup 7 to insure its proper position and alignment. The closure member 9 is then placed in position and secured by nut 17. Finally, spark plug 12 is threaded into the bore 11. In this procedure, it will be noted that the torch nozzle 5' is necessarily brought into proper alignment with the torch conducting opening 5.

From the foregoing description it will be understood that there is no need of disassembling the engine and cylinder head for the purpose of ascertaining the position of the torch nozzle 5' from inside the main combustion chamber 2. Moreover, the procedure of replacing the cup 7 defining the auxiliary combustion chamber 10 now becomes a remarkably simple operation. Also, since the spark plug 12 is fitted in the recess 13 which is directly adjacent to the auxiliary combustion chamber 10 and is in communication therewith by way of small aperture 14, the electrodes 20 of the spark plug are not directly exposed to the rich mixture as it is drawn into the auxiliary combustion chamber 10 during the intake stroke of the engine cycle. Fouling of the spark plug electrodes by unvaporized fuel is thus minimized.

Having fully described our invention, it is to be understood that we are not to be limited to the details herein set forth but that our invention is of the full scope of the appended claims.

We claim:

1. In an internal combustion engine having a main combustion chamber, the combination of: walls forming a cavity, a cup having a cylindrical side wall closed at one end by a bottom wall, the cup being insertable into the cavity along the axis of the cylindrical wall, to define an auxiliary combustion chamber within the cup, means forming a restricted torch nozzle passage connecting the auxiliary chamber and the main chamber, said passage including a first aperture positioned in said cup at one side of the said axis, said cavity walls forming an ignition recess adjacent said cup, a spark plug having electrodes positioned in said recess spaced from and outside said cup, said cup having a second aperture communicating with said ignition recess, whereby alignment of said second aperture with said ignition recess insures proper orientation of said first aperture, and means including a valved intake passage for supplying a rich combustible mixture into the interior of said cup.

2. The combination set forth in claim 1 in which the cavity walls are provided on a stationary member and wherein the restricted passage includes a torch conducting opening in said stationary member, said first aperture being in alignment with the torch conducting opening when the second aperture is aligned with said recess.

3. The combination set forth in claim 1 wherein the spark plug electrodes are positioned in the recess so as to avoid direct contact by the rich mixture being admitted through the valved intake passage into the interior of said cup.

4. The combination set forth in claim 1 wherein means are provided for removably securing said cup in position within said cavity.

5. The combination set forth in claim 1 in which the cup has an open end provided with an external flange, and wherein means are provided for clamping the cup in position within said cavity.

* * * * *

UNITED STATES PATENT OFFICE
CERTIFICATE OF CORRECTION

PATENT NO. : 3,882,830
DATED : May 13, 1975
INVENTOR(S) : Tadashi Kume; Kimio Shinmura It is certified that error appears in the above-identified patent and that said Letters Patent are hereby corrected as shown below:

On first page, after line [21] there should be inserted:

[30] Foreign Application Priority Data
June 30, 1972   Japan . . . . . 77414/72

Signed and Sealed this second Day of December 1975

[SEAL]

Attest:

RUTH C. MASON
*Attesting Officer*

C. MARSHALL DANN
*Commissioner of Patents and Trademarks*